United States Patent
Fukuda

(10) Patent No.: US 9,638,311 B2
(45) Date of Patent: May 2, 2017

(54) POWER TRANSMISSION GEAR UNIT AND VEHICLE INSTRUMENT

(71) Applicant: YAZAKI CORPORATION, Minato-ku, Tokyo (JP)

(72) Inventor: Taisei Fukuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 182 days.

(21) Appl. No.: 14/626,023

(22) Filed: Feb. 19, 2015

(65) Prior Publication Data

US 2015/0233462 A1    Aug. 20, 2015

(30) Foreign Application Priority Data

Feb. 19, 2014    (JP) .................. 2014-029216

(51) Int. Cl.
| | |
|---|---|
| F16H 55/08 | (2006.01) |
| F16H 57/02 | (2012.01) |
| G01P 1/04 | (2006.01) |
| G01P 1/07 | (2006.01) |

(Continued)

(52) U.S. Cl.
CPC .......... *F16H 57/02004* (2013.01); *G01P 1/04* (2013.01); *G01P 1/07* (2013.01); *F16H 1/06* (2013.01); *F16H 1/20* (2013.01); *F16H 2057/02082* (2013.01); *Y10T 74/19651* (2015.01)

(58) Field of Classification Search
CPC . F16H 55/08; F16H 55/0873; F16H 57/02004
USPC .......... 116/284; 29/893, 893.1; 74/339, 457, 74/458, 459.5, 460, 461, 462, 464, 465, 74/466

See application file for complete search history.

(56) References Cited

U.S. PATENT DOCUMENTS

| | | | | |
|---|---|---|---|---|
| 829,926 | A | * | 8/1906 | Lipe .......... F16H 55/08 74/462 |
| 1,277,652 | A | * | 9/1918 | Seymour .......... F16H 55/08 74/339 |

(Continued)

FOREIGN PATENT DOCUMENTS

| | | |
|---|---|---|
| CN | 2453602 Y | 10/2001 |
| CN | 201197111 Y | 2/2009 |

(Continued)

OTHER PUBLICATIONS

Official Action issued on Oct. 25, 2016 in the counterpart Chinese patent application.

*Primary Examiner* — Richard A Smith
(74) *Attorney, Agent, or Firm* — Mots Law, PLLC

(57) ABSTRACT

Hemispherical protrusions are protrudingly provided in end surfaces of a rotor gear and a tooth portion of a small gear having the smaller number of gear teeth between the rotor gear and a large gear of an intermediate gear, and between the small gear of the intermediate gear and an output gear, which are meshed with each other in a transmission gear train. Thus, in a case where the large gear rides on the rotor gear or the small gear rides on the output gear when the intermediate gear is accommodated in a housing after the rotor gear and the output gear are accommodated, it is possible to cancel the riding state thereof only by applying a slight vibration to the housing.

7 Claims, 10 Drawing Sheets

(51) Int. Cl.
 *F16H 1/20* (2006.01)
 *F16H 1/06* (2006.01)

(56) References Cited

U.S. PATENT DOCUMENTS

| | | | | |
|---|---|---|---|---|
| 2,737,057 | A * | 3/1956 | Dorn et al. | F16H 55/08 74/460 |
| 5,864,950 | A * | 2/1999 | Harata et al. | B23P 19/04 29/281.5 |
| 6,624,608 | B2 * | 9/2003 | Komura | H02P 8/08 116/284 |
| 7,612,310 | B2 * | 11/2009 | Ojima et al. | B23H 9/003 219/69.17 |
| 8,899,123 | B2 * | 12/2014 | Lai et al. | F16H 55/14 74/409 |
| 2009/0320632 | A1 * | 12/2009 | Heald et al. | F01L 1/02 74/457 |
| 2016/0258524 | A1 * | 9/2016 | Fuchigami | F16H 55/17 |

FOREIGN PATENT DOCUMENTS

| | | | | |
|---|---|---|---|---|
| CN | 101504054 | A | | 8/2009 |
| CN | 201490869 | U | | 5/2010 |
| GB | 227235 | A * | 1/1925 | ............... F16H 1/06 |
| JP | H06-38497 | A | | 2/1994 |
| JP | 2001-317970 | A | | 11/2001 |
| JP | 2001-327149 | A | | 11/2001 |
| JP | 2006308107 | A * | 11/2006 | ............... F16H 55/08 |
| JP | 2008115886 | A * | 5/2008 | ............... F16H 55/08 |

\* cited by examiner

POWER TRANSMISSION GEAR UNIT AND VEHICLE INSTRUMENT

BACKGROUND

Technical Field

The present invention relates to a power transmission gear unit that transmits power using a gear train.

Related Art

For example, one of vehicle instruments that indicate a scale point according to a measurement value by a pointer is configured to use an inner device, which accelerates rotation power of a stepping motor by an acceleration gear train and transmits the power to the pointer, as a driving source of the pointer (JP 2001-327149 A).

SUMMARY OF THE INVENTION

When such an inner device is assembled, a plurality of gears configuring the gear train is accommodated in a housing of the inner device by an automatic assembly machine such that each rotation axis thereof is parallel. At this time, in the plurality of gears accommodated in the housing of the inner device, when positions of tooth portions of two gears to be meshed coincide with each other in a rotation direction, the tooth portion of one gear is ridden by the tooth portion of the other gear so that both the tooth portions are not meshed.

Thus, the plurality of gears accommodated in the housing of the inner device are configured in a manner such that vibration is applied to the housing by the automatic assembly machine after each gear is accommodated in the housing to cause the other gear to relatively rotate and move with respect to the one gear, the tooth portion of the other gear is dropped to be inserted between two adjacent tooth portions of the one gear, and thereby the gears in the housing are meshed.

However, the time taken until the tooth portion of the other gear is dropped to be inserted between the tooth portions of the one gear on which the other gear has been ridden by the vibration varies depending on the kind or arrangement of the gears, the riding state or the like. Therefore, there are some cases in which the automatic assembly machine is in error and stops due to overtime without reaching the meshed state even after applying the vibration for a certain period of time. In this case, the productivity significantly decreases.

The present invention has been made in view of the above-described circumstances, the object thereof is to provide a power transmission gear unit that allows an easy mesh of gears when a plurality of the gears with rotation axes disposed in parallel with each other is accommodated in a housing from each rotation axis direction, and a suitable vehicle instrument using the same.

In a first aspect of the invention, there is provided a power transmission gear unit, comprising: a housing; and a plurality of gears with rotation axes disposed in parallel with each other, the plurality of gears being accommodated in the housing, wherein the plurality of gears is accommodated in the housing from each rotation axis direction, a pair of the gears to be meshed with each other inside the housing is provided with a processed portion in an end surface part of a tooth portion in an end surface of at least one gear, which is configured to shorten a dimension of a flat portion of the end surface part than an outline of the tooth portion in a rotation direction of the one gear, and the processed portion is provided in a location at which the tooth portion of the one gear meshed with a tooth portion of the other gear between the pair of gears overlaps with the tooth portion of the other gear in a radial direction of the one gear.

When the power transmission gear unit in which the plurality of gears for power transmission is accommodated in the housing is assembled, the power transmission gear unit is configured by accommodating a pair of gears to be meshed with each other in the housing one by one from each rotation axis direction. In this case, the pair of gears is accommodated such that tooth portions of the two gears are meshed with each other since the gear accommodated later is disposed at the same position in the rotation axis direction as the gear previously accommodated as long as positions of the tooth portions of the two gears deviate from each other in the rotation direction.

However, when the positions of the tooth portions of the two gears coincide with each other in the rotation direction, the gear accommodated later rides on the tooth portion of the gear previously accommodated, and thus the gear accommodated later is not disposed at the same position as the gear previously accommodated in the rotation axis direction so that the tooth portions of both the gears are not meshed with each other.

Thus, in the power transmission gear unit according to the present invention, a dimension of a flat portion of an end surface part of the tooth portion is formed to be shorter than an outline of the tooth portion in the rotation direction of one gear by a processed portion provided in the end surface part of the tooth portion of the one gear.

Such a processed portion may be formed by a process, for example, in which a part of an end surface of the tooth portion is resected to cause the dimension of the flat portion to be shorter than the outline of the tooth portion, and the remaining end surface part is formed as a distal end of the tooth portion in the rotation axis direction. Alternatively, for example, the processed portion may be formed by a process in which a protrusion is provided protruding from the end surface of the tooth portion in the rotation axis direction to reduce the dimension of the flat portion of the end surface by the length of the protrusion.

When such a processed portion is provided in the end surface of the tooth portion of one gear, the tooth portion of the other gear may ride on the end surface of the tooth portion of the one gear only within the range of the dimension of the processed portion in the rotation direction of the one gear. Even if the tooth portion of the other gear rides on the tooth portion of the one gear, it is possible to surely cancel the riding state as long as the relative position with the one gear in the rotation direction of the one gear deviates by the length of the dimension of the processed portion, which is shorter than the outline of the tooth portion.

Therefore, when the pair of gears is sequentially accommodated in the housing, the tooth portion of the gear accommodated later hardly rides on the tooth portion of the gear previously accommodated. In addition, even when the tooth portion of the gear accommodated later rides on the tooth portion of the gear previously accommodated, it is possible to cancel the riding state with a slight relative movement of the gears.

Accordingly, it is possible to allow the gears to be easily meshed with each other when the plurality of gears with rotation axes disposed in parallel to each other is accommodated in the housing from each rotation axis direction so that, for example, it is possible to realize the automation of work to accommodate each gear in the housing and cause their mesh by an automatic assembly machine.

The processed portion may include an arc surface at a distal end in the rotation axis direction.

According to such a processed portion of the power transmission gear unit, when the tooth portion of the other gear abuts on the end surface of the tooth portion of the one gear from the rotation axis direction, the tooth portion of the other gear may abut on an arc surface of the distal end of the processed portion in the rotation axis direction in a point-contact state.

Therefore, it is possible to cause the gears to be easily meshed with each other at the time of being accommodated in the housing by reducing the friction due to the contact between both the gears when the tooth portion of the other gear rides on the tooth portion of the one gear so as to allow the gears to easily move relatively in the rotation direction by the vibration, thereby enabling an easy cancellation of the riding state of the tooth portion.

The processed portion may include a protrusion that is provided protruding from an end surface perpendicular to the rotation axis direction in the tooth portion of the one gear.

According to such a power transmission gear unit, the protrusion is newly provided protruding from the end surface of the tooth portion without processing the tooth portion itself in order to provide the processed portion to the tooth portion of the one gear.

Therefore, it is possible to maintain the power transmission performance as the gear by providing a structure in which both the tooth portions are formed such that each tooth portion is meshed with the tooth portion as the other party along the entire length in the rotation axis direction in the state in which the tooth portion of the one gear is meshed with the tooth portion of the other gear.

The one gear may have the smaller number of gear teeth than the other gear between the pair of gears.

According to such a power transmission gear unit, when the pair of gears, which are meshed with each other, has the number of gear teeth different from one another, it is possible to reduce the number of the processed portions to be provided in the gear, and thus to suppress the manufacture cost of the processed portion by providing the processed portion in the end surface of the tooth portion of the gear having the smaller number of gear teeth, compared to the case in which the processed portion is provided in the end surface of the tooth portion of the gear having the larger number of gear teeth.

In a second aspect of the invention, there is provided a vehicle instrument, comprising: a pointer; a stepping motor for rotationally driving the pointer; and a dial plate for indicating a scale corresponding to a measured value by the pointer, wherein the power transmission gear unit according to the first aspect of the invention is used to transmit power from the stepping motor to the pointer, and a rotor gear that is integrally rotated with a magnet rotor of the stepping motor, an intermediate gear that is meshed with the rotor gear and an output gear that is meshed with the intermediate gear and connected to the pointer are configured by the plurality of gears provided in the power transmission gear unit.

According to such a vehicle instrument, it is possible to obtain the similar effect that may be obtained with the power transmission gear unit of the first aspect of the invention.

According to the present invention, the gears may be easily meshed when the plurality of gears with rotation axes disposed in parallel with each other is accommodated in the housing from each rotation axis direction so that, for example, it is possible to realize the automation of work to accommodate each gear in the housing and cause their mesh by an automatic assembly machine.

DESCRIPTION OF THE EMBODIMENTS

An embodiment of an initialization-driving device of a vehicle instrument according to the present invention will be described with reference to drawings.

Figure 1:
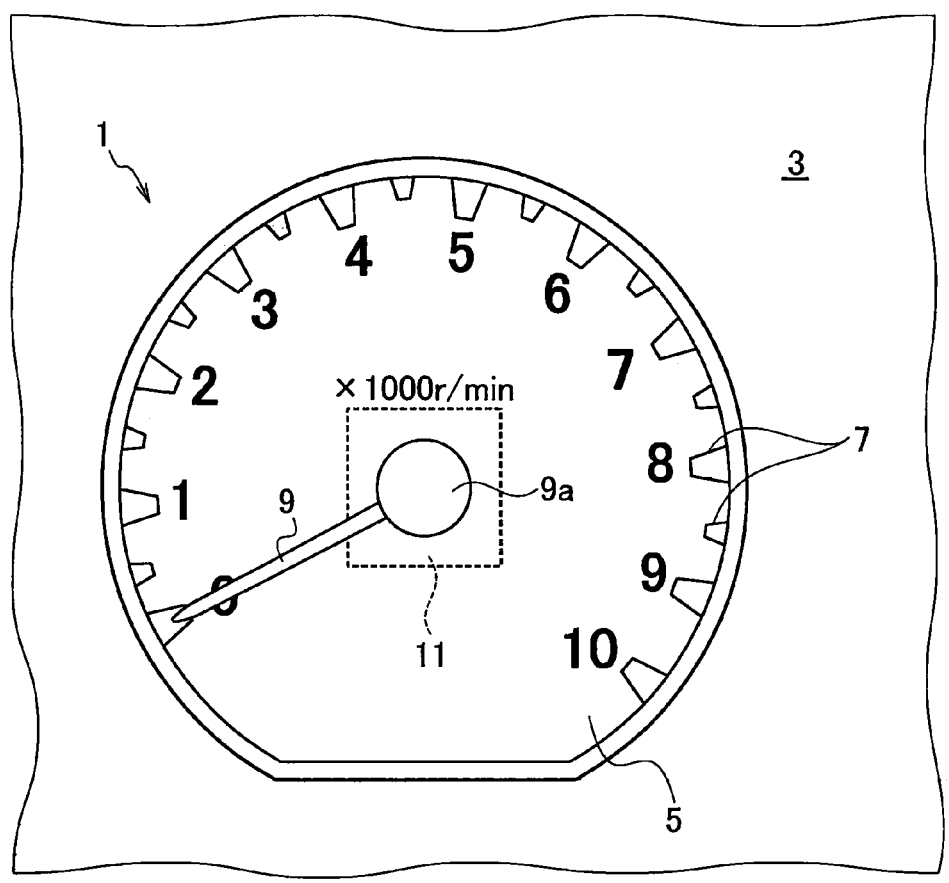
FIG. 1 is a front view of a vehicle instrument according to an embodiment of the present invention to which an initialization-driving device of the present invention is employed.

FIG. 1 is a front view of a vehicle instrument according to an embodiment of an initialization-driving device of the present invention. In FIG. 1, a tachometer indicated by reference numeral 1 is the one according to the embodiment of the vehicle instrument to which a power transmission gear unit of the present invention is employed, and configures a combination meter unit (not illustrated) together with a speed meter, a shift indicator, a warning lamp or the like (not illustrated). The combination meter unit is implemented in an instrument panel of a vehicle and the tachometer 1 displays the rotation speed of an engine of the vehicle.

The tachometer 1 includes a dial plate 5 of which circumference is covered by a facing plate 3 and a light-emitting type pointer 9 which is disposed in front of the dial plate 5 and indicates a scale 7 of the dial plate 5 representing the rotation speed of the engine. The pointer 9 is rotationally driven by an inner device unit 11 that is disposed at the rear of the dial plate 5.

Figure 2:
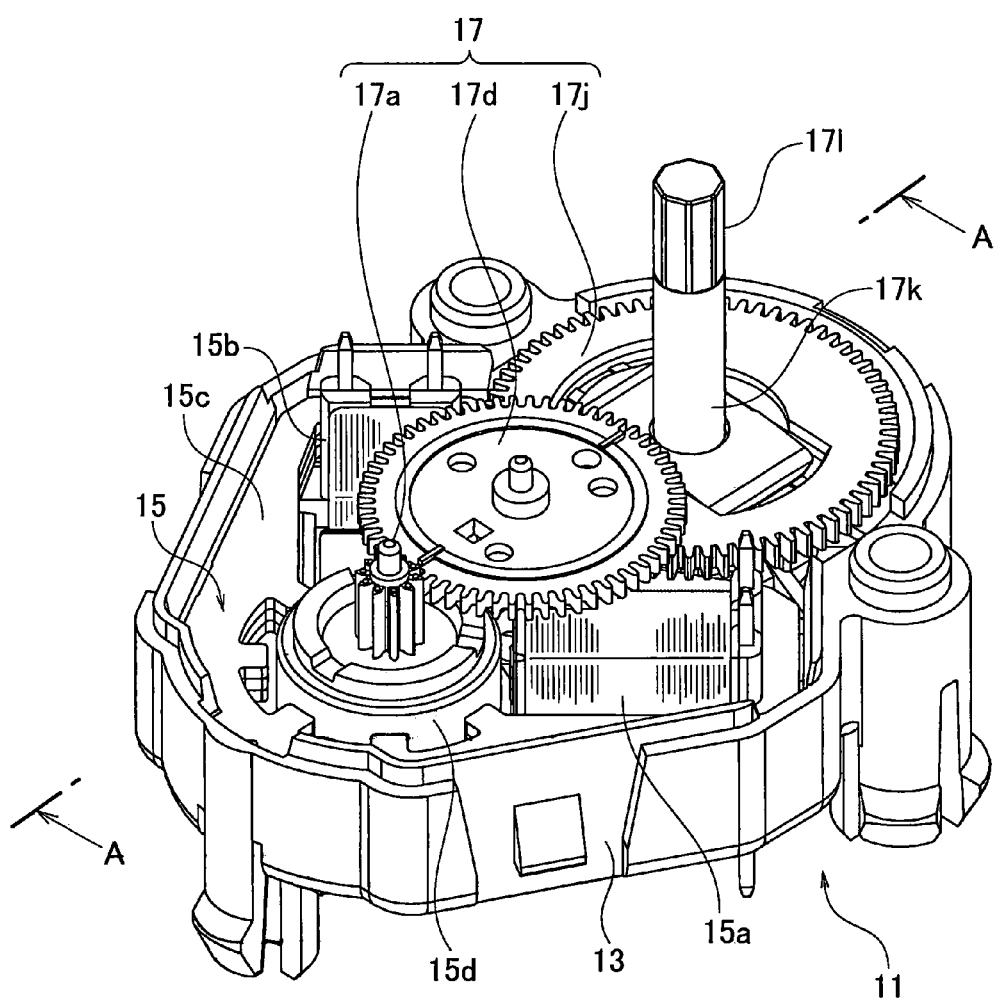
FIG. 2 is a perspective view illustrating a configuration inside a housing of an inner device unit illustrated in FIG. 1.

The inner device unit 11 (corresponding to a power transmission gear unit in the claims) is configured by accommodating a stepping motor 15 and a transmission gear train 17 for power transmission in a housing 13 as illustrated in the perspective view of FIG. 2. An upper opening of the housing 13 accommodating the stepping motor 15 and the transmission gear train 17 is closed by a lid (not illustrated).

Figure 3:
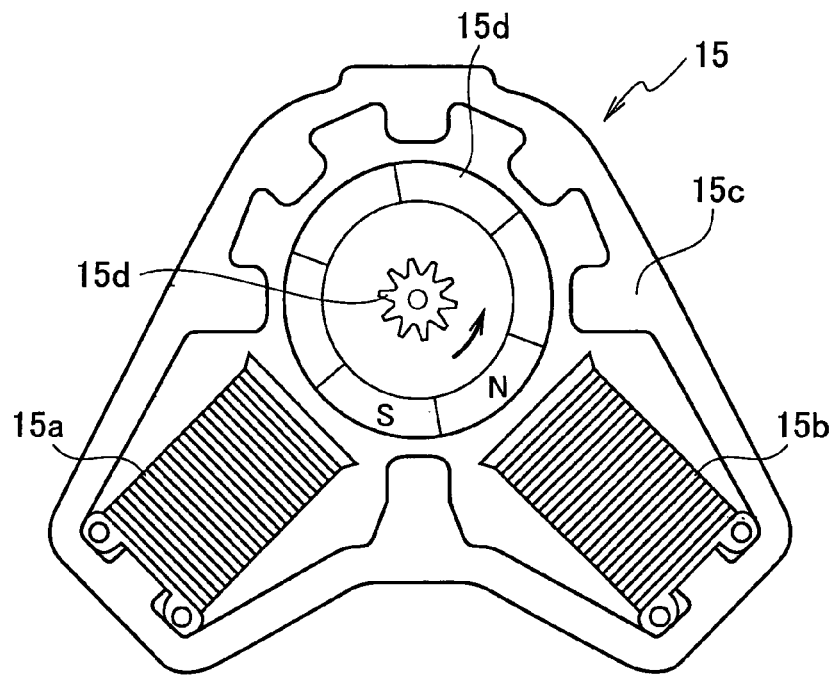
FIG. 3 is an explanatory diagram illustrating a schematic configuration of a stepping motor illustrated in FIG. 2.

The stepping motor 15 includes a yoke 15c holding two stator coils 15a and 15b and a magnet rotor 15d in which N-S poles are alternately magnetized as illustrated in the explanatory diagram of FIG. 3. The magnet rotor 15d is configured to rotate by a certain pitch in respective forward and reverse direction by causing excitation current to flow in each of the two stator coils 15a and 15b to excite the stator coils by pulse signals having an appropriate phase difference.

The transmission gear train 17 illustrated in FIG. 2 includes a rotor gear 17a, an intermediate gear 17d and an output gear 17j.

Figure 4:
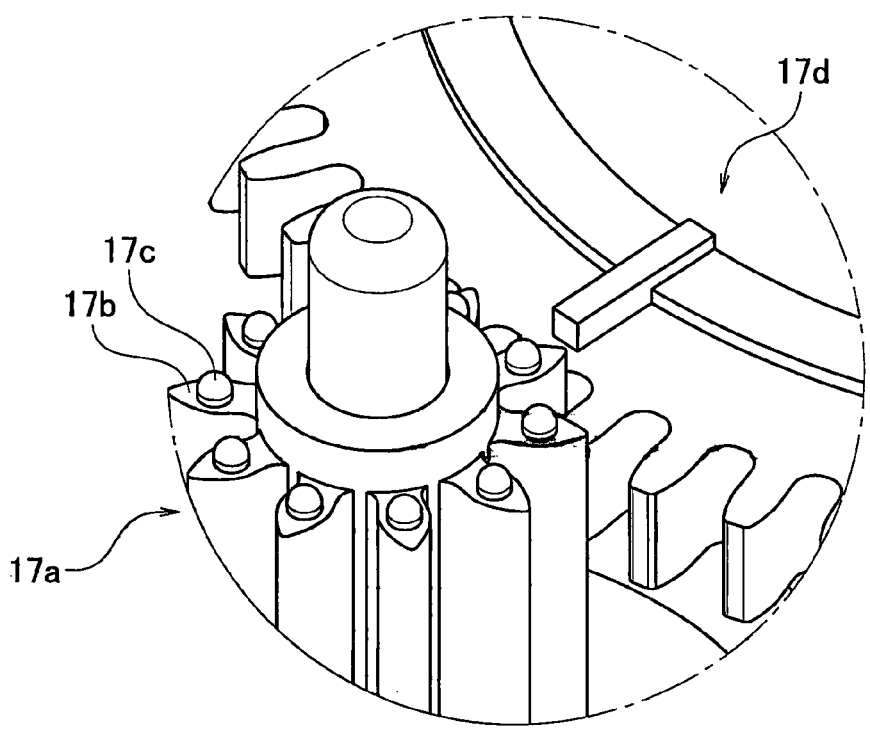
FIG. 4 is an enlarged perspective view of a main part illustrating a protrusion formed in an end surface of a rotor gear illustrated in FIG. 3.

The rotor gear 17a (corresponding to one gear in the claims) is integrally formed with the magnet rotor 15d of the stepping motor 15 on the same rotation axis, and rotates together with the magnet rotor 15d. As illustrated in the enlarged perspective view of the main part of FIG. 4, hemispherical protrusions 17c (corresponding to a processed portion in the claims) are formed in an end surface (corresponding to an end surface part of a tooth portion in an end surface of one gear in the claims) of each tooth portion 17b of the rotor gear 17a which extends in a direction perpendicular to a rotation axis direction of the rotor gear 17a.

Figure 5:
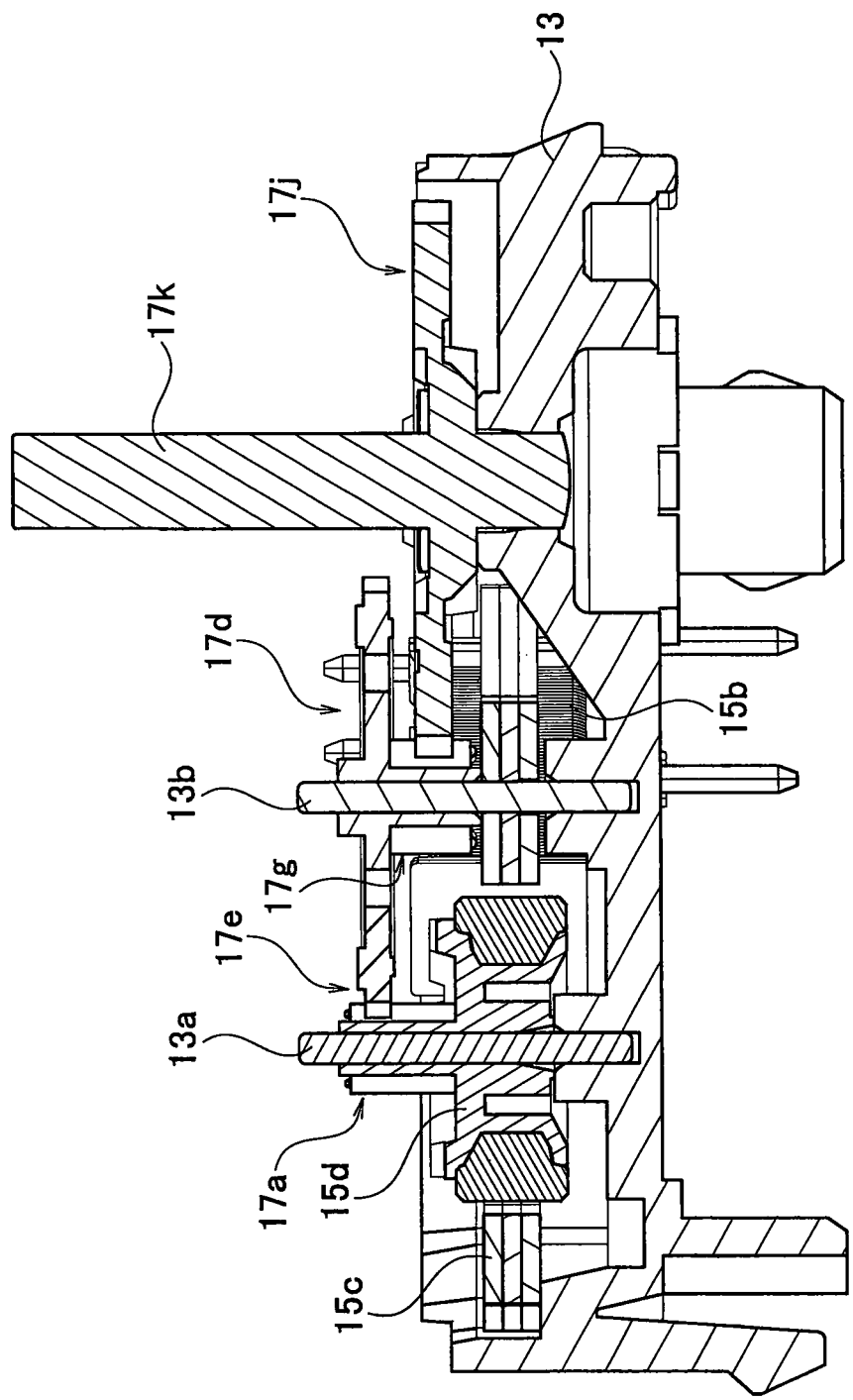
FIG. 5 is a cross-sectional view taken along line A-A of FIG. 2.

As illustrated in FIG. 5 which is the cross-sectional view taken along line A-A of FIG. 2, the rotor gear 17a is held by a rotor axis 13a (corresponding to a rotation axis in the claim) provided upright in the housing 13 so as to rotate integrally with the magnet rotor 15d.

The intermediate gear 17d is a two-stage gear in which a large gear 17e (corresponding to the other gear in the claims) and a small gear 17g (corresponding to one gear in the claims) are integrally formed on the same rotation axis. The intermediate gear 17d accommodates the rotor gear 17a (magnet rotor 15d) and the output gear 17j, then is accommodated in the housing 13 from the small gear 17g side, and is held by an intermediate axis 13b (corresponding to the rotation axis in the claims) provided upright in the housing 13 to be parallel with the rotor axis 13a in a rotatable manner. In this state, the large gear 17e of the intermediate gear 17d is meshed with the rotor gear 17a having the smaller number of gear teeth than the large gear 17e.

Here, the protrusion 17c of the tooth portion 17b of the rotor gear 17a is provided in a location at which the tooth portion 17b of the rotor gear 17a meshed with a tooth portion 17f (see FIG. 8) of the large gear 17e of the intermediate gear 17d overlaps with the tooth portion 17f of the intermediate gear 17d in the radial direction of the rotor gear 17a.

Figure 6:
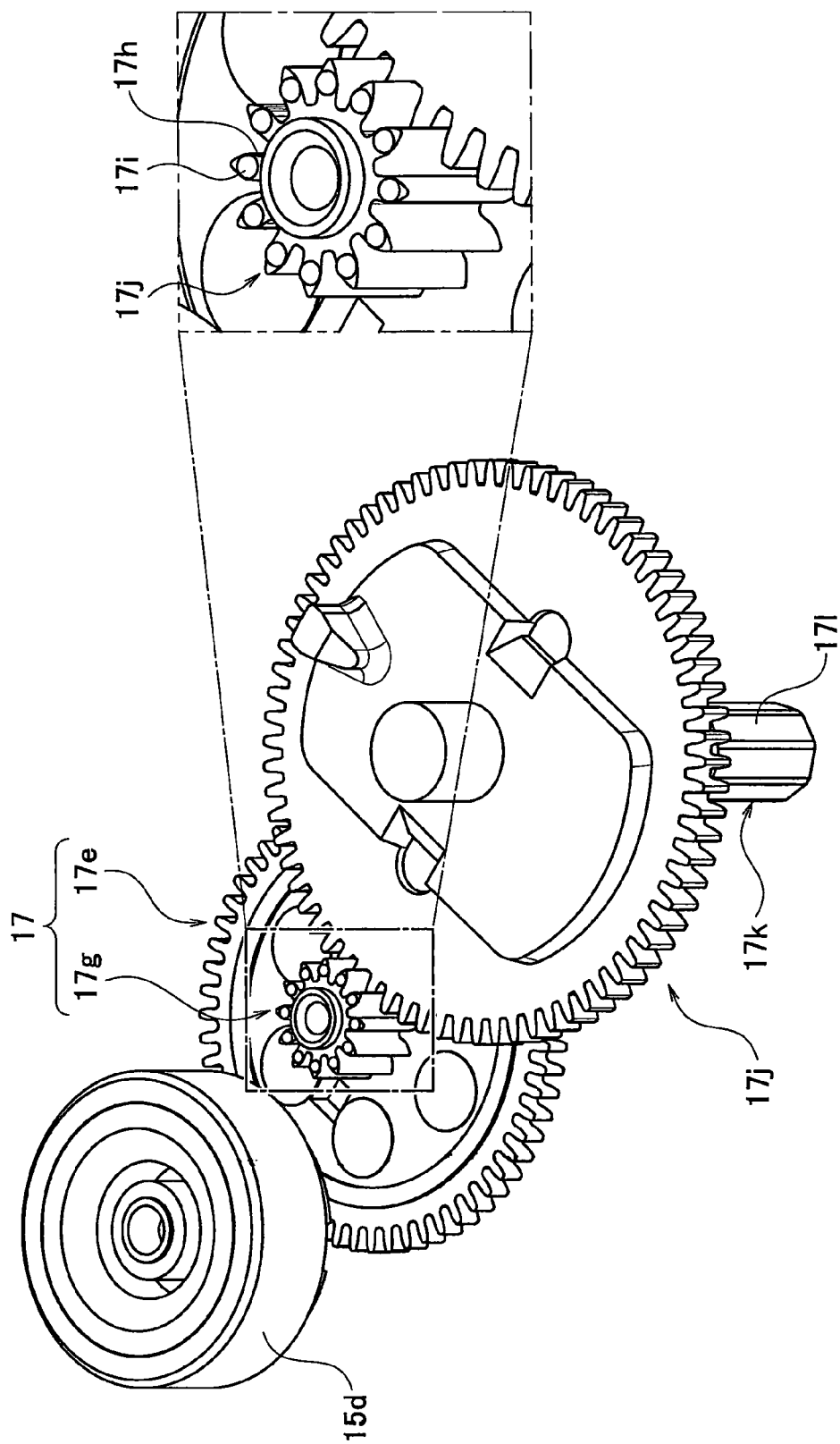
FIG. 6 is a perspective view that a mesh state of gears of a transmission gear train of FIG. 2 is seen from the backside.

Incidentally, as illustrated in the perspective view of FIG. 6, hemispherical protrusions 17i (corresponding to a processed portion) are formed in an end surface (corresponding to an end surface part of a tooth portion in an end surface of one gear in the claims) of each gear 17h of the small gear 17g that extends in the direction perpendicular to the rotation axis direction of the intermediate gear 17d.

As illustrated in FIG. 5, the output gear 17j (corresponding to the other gear in the claims) includes a rotation axis 17k (corresponding to the rotation axis in the claims) in an integral manner. As illustrated in FIG. 2, a serration 17l is formed in a distal end of the rotation axis 17k, and a base portion 9a (see FIG. 1) of the pointer 9 is press-fitted into a part of the serration 17l. The press-fitted base portion 9a of the pointer 9 is rotation-stopped with respect to the rotation axis 17k by the serration 17l.

As illustrated in FIG. 5, the rotation axis 17k of the output gear 17j accommodated in the housing 13 is rotatably held by the housing 13. In this state, as illustrated in FIG. 6, the output gear 17j is meshed with the small gear 17g of the intermediate gear 17d having the smaller number of gear teeth than the output gear 17j in the backside of the large gear 17e, which is to be accommodated in the housing 13 later, of the intermediate gear 17d.

Here, the protrusion 17i of the tooth portion 17h (of the small gear 17g) of the intermediate gear 17d is provided in a location at which the tooth portion 17h of the small gear 17g meshed with a tooth portion 17m of the output gear 17j overlaps with the tooth portion 17m of the output gear 17j in the radial direction of the intermediate gear 17d (small gear 17g).

Next, the assembly procedure of the inner device unit 11 will be described with reference to FIGS. 7 to 10.

First, both the yoke 15c holding the two stator coils 15a and 15b and the magnet rotor 15d, and both the rotor gear 17a and the output gear 17j are respectively accommodated in the housing 13.

Figure 7:
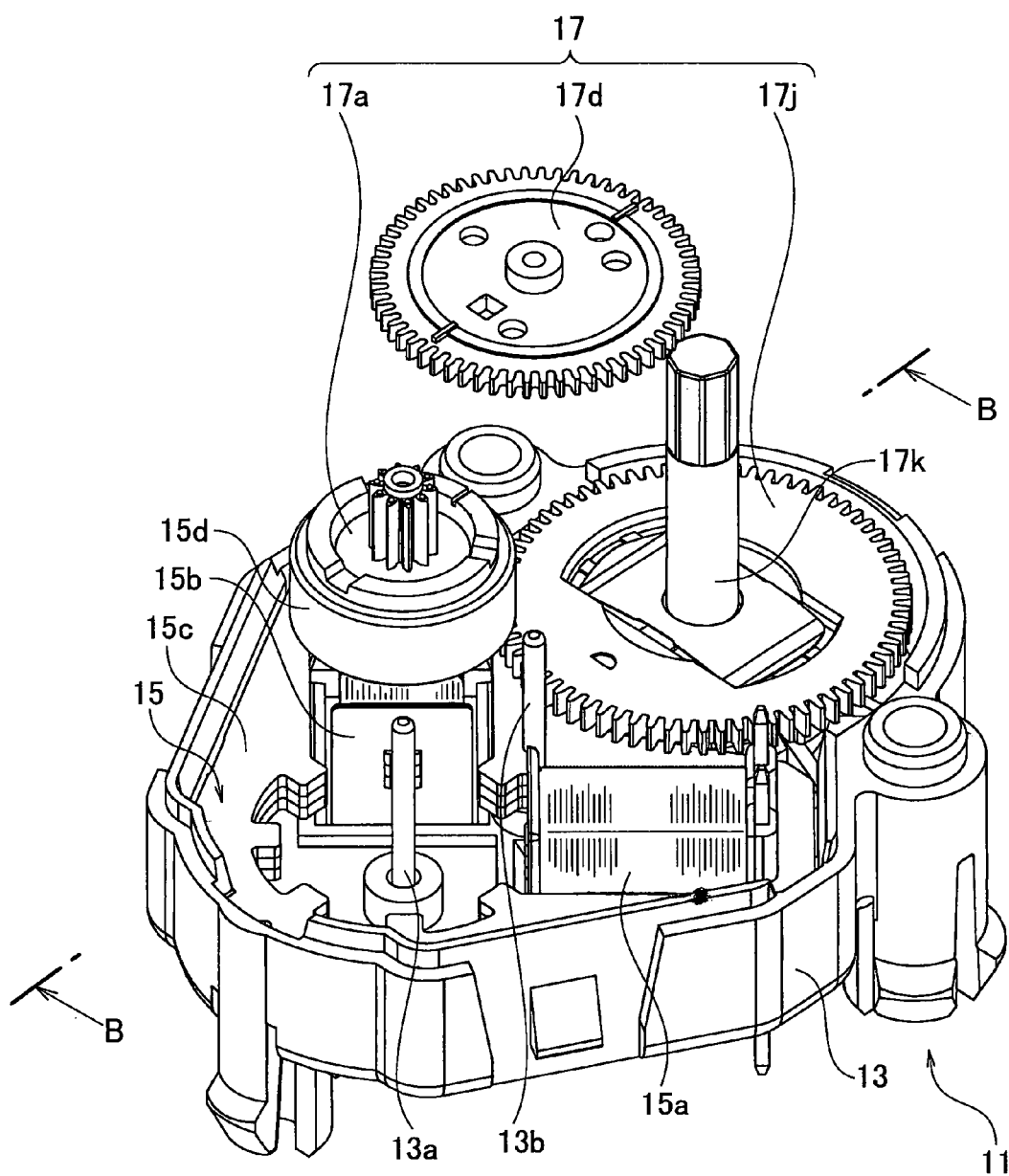
FIG. 7 is a perspective view illustrating an assembly procedure of the inner device unit illustrated in FIG. 1.

In the perspective view of FIG. 7, a case where the yoke 15c and the output gear 17j are accommodated the first in the housing 13, and then the magnet rotor 15d (rotor gear 17a) is accommodated in the housing 13 thereafter is illustrated. However, the accommodation order of the yoke 15c, the magnet rotor 15d (rotor gear 17a), and the output gear 17j into the housing 13 is arbitrary.

Figure 8:
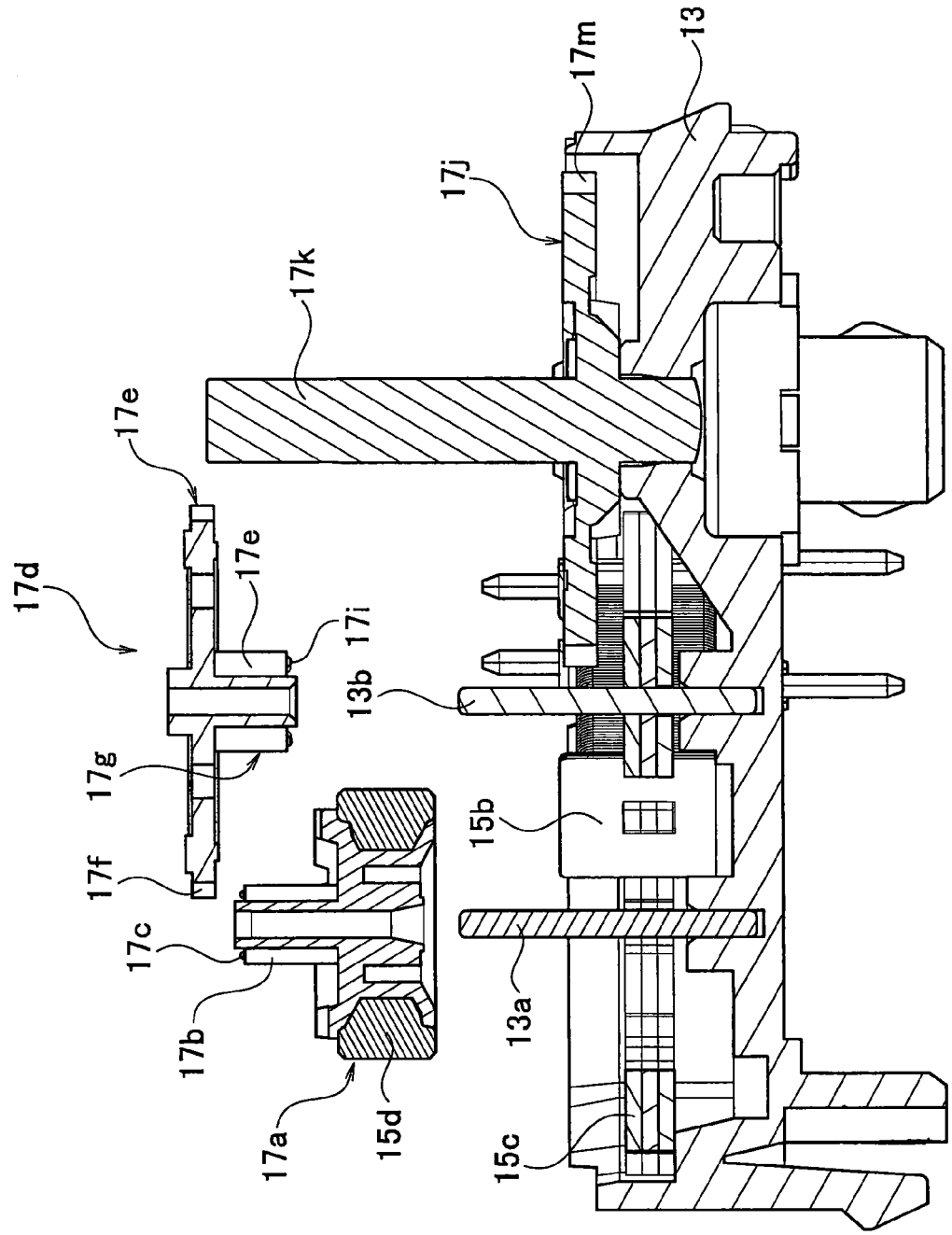
FIG. 8 is a cross-sectional view taken along line B-B of FIG. 7.

In the example of procedure illustrated in FIG. 7, as illustrated in FIG. 8 which is the cross-sectional view taken along line B-B of FIG. 7, the rotor gear 17a integrated with the magnet rotor 15d on the same axis is mounted from the magnet rotor 15d side so as to be rotatably held by the rotor axis 13a, and then is accommodated in the housing 13. Subsequently, the intermediate gear 17d is mounted from the small gear 17g side to be rotatably held by the intermediate axis 13b, and then is accommodated in the housing 13.

Figure 9:
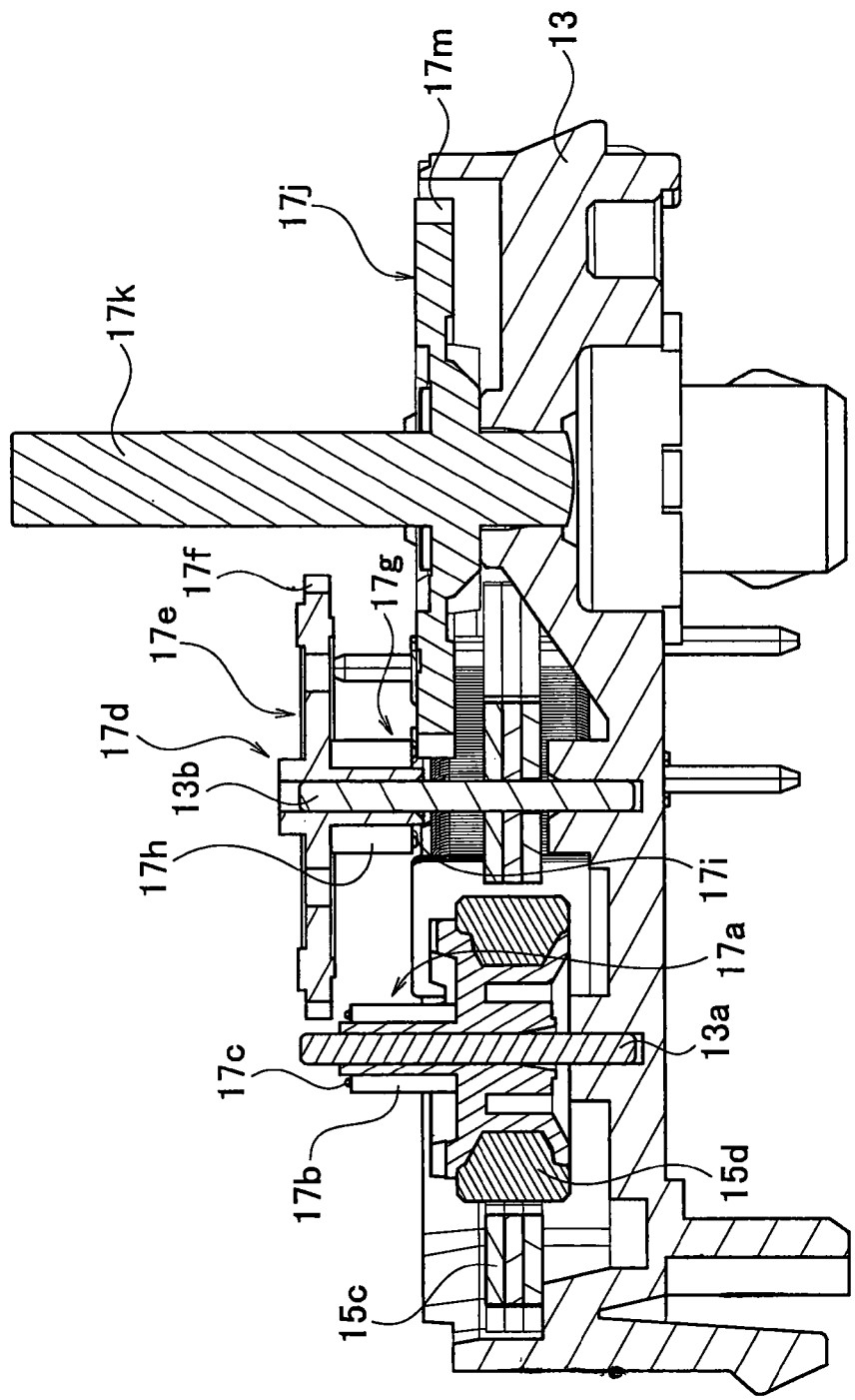
FIG. 9 is a cross-sectional view illustrating a state inside the housing, which is generated in the course of a magnet rotor and the rotor gear being accommodated in the housing.
Figure 10:
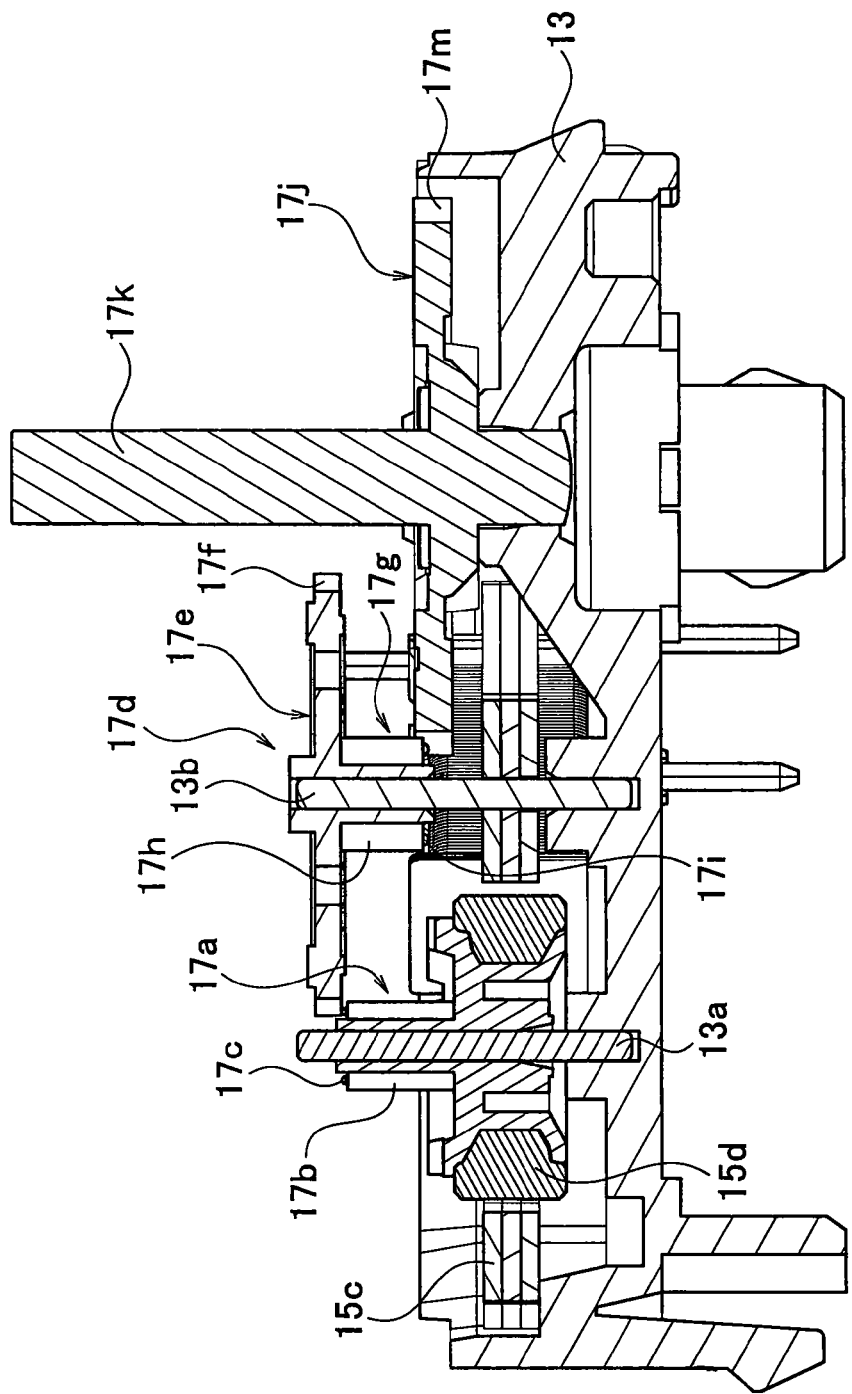
FIG. 10 is a cross-sectional view illustrating the state inside the housing which is generated in the course of the magnet rotor and the rotor gear being accommodated in the housing.

When the intermediate gear 17d mounted to the intermediate axis 13b is moved toward the root of the intermediate axis 13b to be accommodated in the housing 13, a distal end of the protrusion 17i of the tooth portion 17h of the small gear 17g reaches the same position that an end surface of the tooth portion 17m of the output gear 17j reaches, in the axial direction of the intermediate axis 13b as illustrated in the cross-sectional view of FIG. 9.

Here, when the tooth portion 17h of the small gear 17g is located between the two adjacent tooth portions 17m of the output gear 17j in the rotation direction of the intermediate gear 17d, the tooth portion 17h is inserted between the two adjacent tooth portions 17m so as to enable further movement of the intermediate gear 17d toward the root of the intermediate axis 13b, and accordingly, the small gear 17g is meshed with the output gear 17j.

However, when the tooth portion 17h of the small gear 17g is at a location deviated from the portion between the two adjacent tooth portions 17m of the output gear 17j, at least a part of the tooth portion 17h of the small gear 17g rides on the end surface of the tooth portion 17m extending in the direction perpendicular to the rotation axis 17k of the output gear 17j. Then, the intermediate gear 17d may not further move toward the root of the intermediate axis 13b, and accordingly, the small gear 17g is not meshed with the output gear 17j.

At this time, when the protrusion 17i is not provided protruding from an end surface of the tooth portion 17h of the small gear 17g, the end surface of the tooth portion 17h of the small gear 17g is in surface-contact with the end surface of the tooth portion 17m of the output gear 17j so that a frictional force according to the contact area is applied between the intermediate gear 17d and the output gear 17j which are to rotate relatively. Accordingly, in order to cancel the riding of the small gear 17g with respect to the output gear 17j, it is necessary to apply an external force such as vibration exceeding the frictional force according to the contact area between the end surfaces of both the tooth portions 17h and 17m in a direction in which the intermediate gear 17d and the output gear 17j relatively rotate.

In regard to this, in the inner device unit 11 according to this embodiment, the protrusion 17i is protrudingly provided in the location at which the end surface of the tooth portion 17h of the small gear 17g of the intermediate gear 17d overlaps with the tooth portion 17m of the output gear 17j in the radial direction of the intermediate gear 17d (small gear 17g). Thus, when the position of the tooth portion 17h of the small gear 17g deviates from the portion between the two adjacent tooth portions 17m of the output gear 17j at the time of assembly in which the small gear 17g and the output gear 17j are accommodated in the housing 13, the distal end of the protrusion 17i of the tooth portion 17h of the small gear 17g or an end surface around the protrusion 17i abuts on the end surface of the tooth portion 17m of the output gear 17j. Alternatively, an arc-shaped side surface other than the distal end of the protrusion 17i of the tooth portion 17h of the small gear 17g abuts on the periphery of the tooth portion 17m of the output gear 17j.

Among them, when the side surface of the protrusion 17i of the tooth portion 17h abuts on the periphery of the tooth portion 17m of the output gear 17j, the intermediate gear 17d and the output gear 17j relatively rotate while the contact portion with the periphery of the tooth portion 17m moves from the distal end side of the protrusion 17i of the tooth portion 17h to the root side. Then, consequently, the end surface around the protrusion 17i in the tooth portion 17h of the small gear 17g abuts on the end surface of the tooth portion 17m of the output gear 17j.

Thus, when the tooth portion 17h of the small gear 17g rides on the end surface of the tooth portion 17m of the output gear 17j, eventually, the distal end of the protrusion 17i of the tooth portion 17h of the small gear 17g or the end surface around the protrusion 17i abuts on the end surface of the tooth portion 17m of the output gear 17j.

Further, when the end surface of the tooth portion 17m of the output gear 17j is in contact with the distal end of the protrusion 17i of the tooth portion 17h of the small gear 17g, since the contact is a point-contact, the contact area between the both is extremely small. Thus, the frictional force applied between the intermediate gear 17d and the output gear 17j, which rotate relatively, is small according to the area of the point-contact. Accordingly, it is possible to cancel the riding of the small gear 17g with respect to the output gear 17j if the external force such as vibration exceeding the small frictional force according to the point-contact area is applied in the direction in which the intermediate gear 17d and the output gear 17j relatively rotate.

In addition, when the end surface of the tooth portion 17m of the output gear 17j is in contact with the end surface around the protrusion 17i of the tooth portion 17h of the small gear 17g, the end surfaces are in surface-contact. However, the range of the end surface of the tooth portion 17h of the small gear 17g that is in surface-contact with the end surface of the tooth portion 17m of the output gear 17j is limited only to a part around the protrusion 17i. Thus, a dimension of a flat portion in the end surface of the tooth portion 17h of the small gear 17g in the rotation direction of the intermediate gear 17d is shorter than an outline of the tooth portion 17h.

Thus, compared to a case in which the protrusion 17i is not protrudingly provided in the end surface of the tooth portion 17h, the contact area between both the end surfaces and a riding width of the small gear 17g with respect to the output gear 17j in the rotation direction of the intermediate gear 17d are limited to be small. Accordingly, it is possible to cancel the riding of the small gear 17g with respect to the output gear 17j if the external force such as vibration exceeding the frictional force according to such a limited contact area is applied in the direction in which the intermediate gear 17d and the output gear 17j relatively rotate.

In this manner, the riding of the small gear 17g with respect to the output gear 17j is canceled, and the tooth portion 17h of the small gear 17g is inserted between the two adjacent tooth portions 17m of the output gear 17j so that the small gear 17g is meshed with the output gear 17j. At this time, as illustrated in the cross-sectional view of FIG. 10, the end surface of the tooth portion 17f of the large gear 17e reaches the same position as a distal end of the protrusion 17c of the tooth portion 17b of the rotor gear 17a in the axial direction of the intermediate axis 13b.

Here, when the tooth portion 17f of the large gear 17e is located between the two adjacent tooth portions 17b of the rotor gear 17a in the rotation direction of the intermediate gear 17d, the tooth portion 17f is inserted between the two adjacent tooth portions 17b so that it is possible to further move the intermediate gear 17d toward the root of the intermediate axis 13b, and accordingly, the large gear 17e is meshed with the rotor gear 17a.

However, when the tooth portion 17f of the large gear 17e is at a location deviated from the portion between the two adjacent tooth portions 17b of the rotor gear 17a, the end surface of the tooth portion 17f of the large gear 17e rides on at least a part of the tooth portion 17b of the rotor gear 17a. Then, the intermediate gear 17d may not move further toward the root of the intermediate axis 13b so that the large gear 17e is not meshed with the rotor gear 17a.

At this time, when the protrusion 17c is not protrudingly provided in the end surface of the tooth portion 17b of the rotor gear 17a, the end surface of the tooth portion 17f of the large gear 17e is in surface-contact with the end surface of the tooth portion 17b of the rotor gear 17a so that the frictional force according to the contact area is applied between the rotor gear 17a and the intermediate gear 17d that are to relatively rotate. Accordingly, in order to cancel the riding of the large gear 17e with respect to the rotor gear 17a, it is necessary to apply the external force such as vibration exceeding the frictional force according to the contact area between the end surfaces of both the tooth portions 17b and 17f in a direction in which the rotor gear 17a and the intermediate gear 17d relatively rotate.

In regard to this, in the inner device unit 11 according to this embodiment, the protrusion 17c is protrudingly provided in the location at which the end surface of the tooth portion 17b of the rotor gear 17a overlaps with the tooth portion 17f of the large gear 17e of the intermediate gear 17d in the radial direction of the rotor gear 17a. Thus, when the position of the tooth portion 17f of the large gear 17e deviates from the portion between the two adjacent tooth portions 17b of the rotor gear 17a at the time of assembly in which the rotor gear 17a is accommodated in the housing 13, the end surface of the tooth portion 17f of the large gear 17e abuts on the distal end of the protrusion 17c of the tooth portion 17b of the rotor gear 17a or the end surface around the protrusion 17c. Alternatively, the periphery of the tooth portion 17f of the large gear 17e abuts on an arc-shaped side surface other than the distal end of the protrusion 17c of the tooth portion 17b of the rotor gear 17a.

Among them, when the periphery of the tooth portion 17f of the large gear 17e abuts on the side surface of the protrusion 17c, the rotor gear 17a and the intermediate gear 17d relatively rotate while the portion on which the periphery of the tooth portion 17f abuts moves from the distal end side of the protrusion 17c of the tooth portion 17b to the root side. Then, consequently, the end surface of the tooth portion 17f of the large gear 17e abuts on the end surface around the protrusion 17c in the tooth portion 17b of the rotor gear 17a.

Thus, when the end surface of the tooth portion 17f of the large gear 17e rides on the tooth portion 17b of the rotor gear 17a, eventually, the end surface of the tooth portion 17f of the large gear 17e abuts on the distal end of the protrusion 17c of the tooth portion 17b of the rotor gear 17a or the end surface around the protrusion 17c.

Further, when the end surface of the tooth portion 17f of the large gear 17e is in contact with the distal end of the protrusion 17c of the tooth portion 17b of the rotor gear 17a, since the contact is a point-contact, the contact area between the both is extremely small. Accordingly, the frictional force applied between the rotor gear 17a and the intermediate gear 17d which are to relatively rotate is also small according to the area of the point-contact. Accordingly, it is possible to cancel the riding of the large gear 17e with respect to the rotor gear 17a if the external force such as vibration exceeding the small frictional force according to the point-contact area is applied in the direction in which the rotor gear 17a and the intermediate gear 17d relatively rotate.

In addition, when the end surface around the protrusion 17c of the tooth portion 17b of the rotor gear 17a is in contact with the end surface of the tooth portion 17f of the large gear 17e, the end surfaces are in surface-contact. However, the range of the end surface of the tooth portion 17b of the rotor gear 17a that is in surface-contact with the end surface of the tooth portion 17f of the large gear 17e is limited only to a part around the protrusion 17c. Thus, a dimension of a flat portion in the end surface of the tooth portion 17b of the rotor gear 17a in the rotation direction of the rotor gear 17a is shorter than an outline of the tooth portion 17b.

Thus, compared to a case in which the protrusion 17c is not protrudingly provided in the end surface of the tooth portion 17b, the contact area between both the end surfaces and a riding width of the large gear 17e with respect to the rotor gear 17a in the rotation direction of the rotor gear 17a are limited to be small. Accordingly, it is possible to cancel the riding of the large gear 17e with respect to the rotor gear 17a if the external force such as vibration exceeding the frictional force according to such a limited contact area is applied in the direction in which the rotor gear 17a and the intermediate gear 17d relatively rotate.

In this manner, the riding of the large gear 17e with respect to the rotor gear 17a is canceled. Further, when the tooth portion 17f of the large gear 17e is inserted between the two adjacent tooth portions 17b of the rotor gear 17a so that the large gear 17e is meshed with the rotor gear 17a, as illustrated in the cross-sectional view of FIG. 5, the intermediate gear 17d moves until the root of the intermediate axis 13b to be in a state of being accommodated in the housing 13.

As described above, according to the inner device unit 11 of this embodiment, the hemispherical protrusions 17c and 17i are protrudingly provided in the end surfaces of the tooth portions 17b and 17h of the rotor gear 17a and the small gear 17g having the smaller number of gear teeth between the rotor gear 17a and the large gear 17e of the intermediate gear 17d, and between the small gear 17g of the intermediate gear 17d and the output gear 17j, which are meshed with each other in the transmission gear train 17.

Thus, in a case where the large gear 17e rides on the rotor gear 17a, or the small gear 17g rides on the output gear 17j when the intermediate gear 17d is accommodated in the housing 13 after the rotor gear 17a and the output gear 17j are accommodated, it is possible to cancel the riding state thereof only by applying a slight vibration to the housing 13.

Accordingly, the small gear 17g and the output gear 17j, and the large gear 17e and the rotor gear 17a are easily meshed so that, for example, it is possible to realize automation of the work to accommodate the rotor gear 17a, the intermediate gear 17d, and the output gear 17j of the transmission gear train 17 in the housing 13 and cause their mesh by an automatic assembly machine (not illustrated).

Incidentally, in this embodiment, it is configured such that the protrusion 17i of the tooth portion 17h of the small gear 17g abuts on the tooth portion 17m of the output gear 17j before the tooth portion 17f of the large gear 17e abuts on the protrusion 17c of the tooth portion 17b of the rotor gear 17a when the intermediate gear 17d is mounted to the intermediate axis 13b of the housing 13. However, when each of the protrusions 17c and 17i abuts on the corresponding end surface of the tooth portions 17f or 17m, any protrusion may be abut on the corresponding end surface the first or the both may be abut on each of the end surfaces at the same time according to the design of the transmission gear train 17 or the inner device unit 11.

In addition, hemispherical protrusions may be protrudingly provided also in the end surfaces of the tooth portions 17f and 17m of the large gear 17e and the output gear 17j having the larger number of gear teeth between the rotor gear 17a and the large gear 17e of the intermediate gear 17d, and between the small gear 17g of the intermediate gear 17d and the output gear 17j, which are meshed with each other. In addition, in such a case, the respective protrusions 17c and 17i of the end surfaces of the tooth portions 17b and 17h of the rotor gear 17a and the small gear 17g may not be provided.

Furthermore, when the protrusion is provided to only the end surface of the any one tooth portion between the rotor gear 17a and the large gear 17e of the intermediate gear 17d, and between the small gear 17g of the intermediate gear 17d and the output gear 17j, which are meshed with each other, it is possible to reduce the number of protrusions to be provided in the entire gear of the transmission gear train 17 if the protrusion 17c and 17i are protrudingly provided only in the end surfaces of the tooth portions 17b and 17h of the rotor gear 17a and the small gear 17g having the smaller number of gear teeth as described in this embodiment.

In addition, the processed portion to be provided in the end surface of the tooth portion of at least one gear between the pair of gears, which are meshed with each other, in the transmission gear train 17 is configured by the hemispherical protrusions 17c and 17i provided protruding from the end surface. However, the configuration of the processed part may be arbitrary, for example, cylindrical, polygonal columnar, frustoconical, conical, polygonal-pyramid, or the like.

In particular, when the distal end of the protrusion is the arc surface as described in this embodiment, it is possible to minimize the area of the protrusion that is in contact with the corresponding end surface of the tooth portion as much as possible so that it is possible to reduce the friction caused by the contact between the both when the tooth portion of one gear is ridden by the tooth portion of the other gear between the pair of gears, which are meshed with each other, in the transmission gear train 17. With such a configuration, both the gears in which the tooth portion rides on the other are easily moved relatively in the rotation direction by vibration applied to the housing 13 and the riding state of the tooth portion may be easily canceled so that it is possible to facilitate the mesh of the gears when being accommodated in the housing 13.

In addition, the processed portion to be provided in the end surface of the tooth portion of the gear is not limited to the protrusion provided protruding from the end surface. For example, as illustrated in the explanatory diagram of FIG. 11, tapered surfaces 19b may be formed in the boundaries between an end surface of a tooth portion 19a of a gear 19, as a target to be provided with the processed portion, and both the tooth surfaces of the gear 19 in the rotation direction, to serve as processed portions 19c.

For example, when such a processed portion 19c is formed in the end surface of the tooth portion 17b of the rotor gear 17a to be meshed with the large gear 17e of the intermediate gear 17d, the dimension of the flat portion in the end surface of the tooth portion 17b of the rotor gear 17a in the rotation direction of the rotor gear 17a is shorter than the outline of the tooth portion 17b.

Thus, in the case where the end surface of the tooth portion 17f of the large gear 17e rides on the end surface of the tooth portion 17b of the rotor gear 17a, the area of the end surface of the tooth portion 17b of the rotor gear 17a with which the end surface of the tooth portion 17f of the large gear 17e is in surface-contact and a riding width of the large gear 17e with respect to the rotor gear 17a in the rotation direction of the rotor gear 17a are limited to be small. Accordingly, it is possible to cancel the riding of the large gear 17e with respect to the rotor gear 17a if the external force such as vibration exceeding the frictional force according to such a limited contact area is applied in the direction in which the rotor gear 17a and the intermediate gear 17d relatively rotate.

Figure 11:
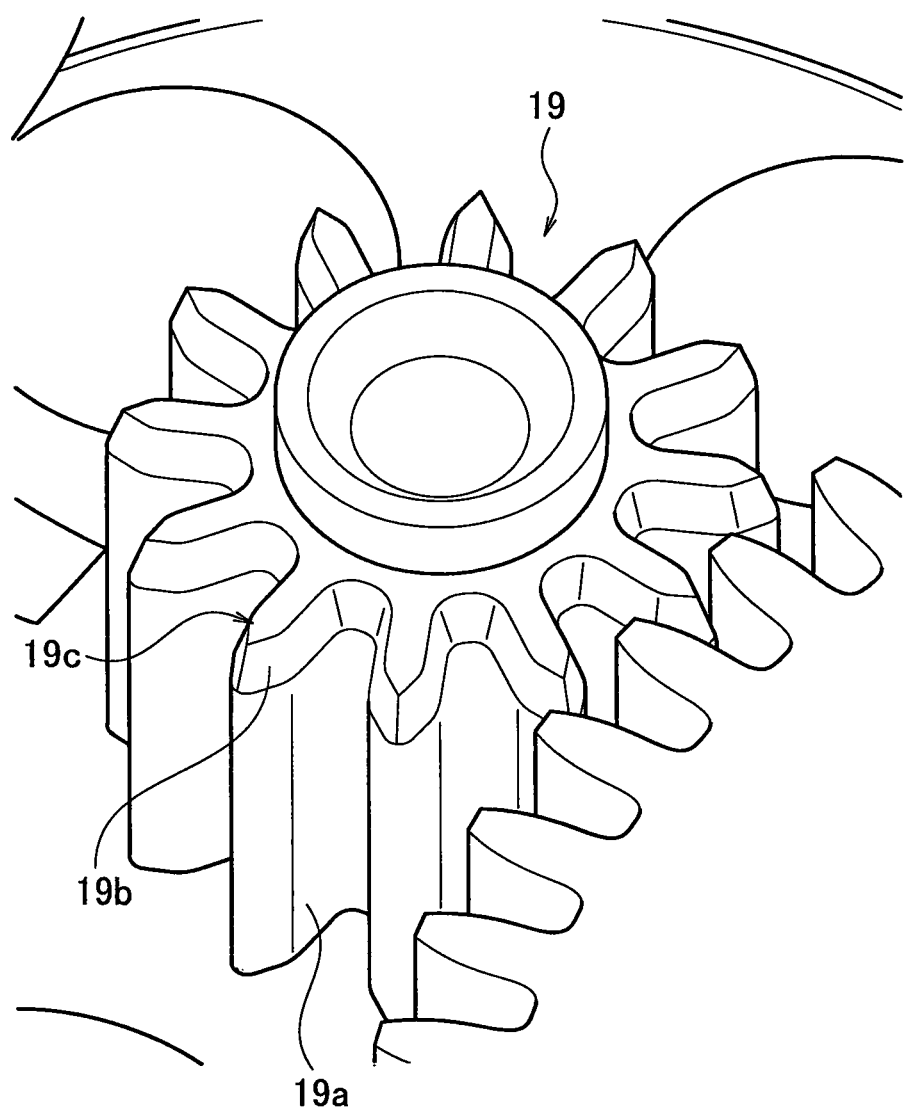
FIG. 11 is an explanatory diagram illustrating another example of a processed portion to be provided in an end surface of a tooth portion of a gear of the transmission gear train of FIG. 2.

However, in the case where the tapered surface 19b is formed as the processed portion 19c in the end surface of the tooth portion 19a of the gear 19 as illustrated in FIG. 11, it is easy to provide the processed portion 19c in terms of manufacture, whereas, the range in which the gear 19 is meshed with a tooth portion of a gear as a mesh counterpart (not illustrated) shortens in the rotation direction of the gear 19 to cause a poor power transmission performance as the transmission gear train. Thus, when the power transmission performance is the preferred, it is advantageous to provide the protrusion protruding from the end surface of the tooth portion as the processed portion.

Furthermore, in the above-described embodiment, the description has been made for the case in which the present invention is employed to the inner device unit 11 of rotationally driving the pointer 9 of the tachometer 1. However, the present invention may be employed also to, for example, a power transmission gear unit in which only the transmission gear train 17 is accommodated in the housing 13 without the stepping motor 15 being incorporated therein. In addition, it is obvious that the present invention may be employed to a unit of transmitting power using a gear train in the field other than the vehicle instrument.

The present invention is greatly advantageous when being employed to the power transmission gear unit that transmits power using the gear train.

What is claimed is:

1. A power transmission gear unit comprising:
a housing; and
a plurality of gears with rotation axes disposed in parallel with each other, the plurality of gears being accommodated in the housing, wherein
the plurality of gears is accommodated in the housing from each rotation axis direction,
a pair of the plurality of gears to be meshed with each other inside the housing is provided with a processed portion in an end surface part of a tooth portion in an end surface of at least one of the plurality of gears, which is configured to shorten a dimension of a flat portion of the end surface part within an outline of the tooth portion in a rotation direction of the at least one of the plurality of gears, and
the processed portion is provided in a location at which the tooth portion of the at least one of the plurality of gears meshed with a tooth portion of an other of the plurality of gears between the pair of the plurality of gears overlaps with the tooth portion of the other of the plurality of gears in a radial direction of the one of the plurality of gears,
wherein the tooth portion in the at least one of the plurality of gears has a shape of a pointed arch.

2. The power transmission gear unit according to claim 1, wherein the processed portion includes an arc surface at a distal end in the rotation axis direction.

3. The power transmission gear unit according to claim 1, wherein the processed portion includes a protrusion that is provided protruding from an end surface perpendicular to the rotation axis direction in the tooth portion of the one of the plurality of gears.

4. The power transmission gear unit according to claim 3, wherein the protrusion is hemispherical.

5. The power transmission gear unit according to claim 1, wherein the one of the plurality of gears has the smaller number of gear teeth than the other of the plurality of gears between the pair of gears.

6. A vehicle instrument comprising:
a pointer;
a stepping motor for rotationally driving the pointer; and
a dial plate for indicating a scale corresponding to a measured value by the pointer, wherein
the power transmission gear unit according to claim 1 is used to transmit power from the stepping motor to the pointer, and
a rotor gear that is integrally rotated with a magnet rotor of the stepping motor, an intermediate gear that is meshed with the rotor gear and an output gear that is meshed with the intermediate gear and connected to the pointer are configured by the plurality of gears provided in the power transmission gear unit.

7. The power transmission gear unit according to claim 1, wherein the flat portion is formed on the processed portion.

\* \* \* \* \*